United States Patent
Lin

(10) Patent No.: US 11,719,314 B2
(45) Date of Patent: Aug. 8, 2023

(54) NUT STRUCTURE FOR ELECTRIC PUSHING ROD

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 11 days.

(21) Appl. No.: 17/227,353

(22) Filed: Apr. 11, 2021

(65) Prior Publication Data

US 2022/0282775 A1 Sep. 8, 2022

(30) Foreign Application Priority Data

Mar. 3, 2021 (TW) ................................ 110202305

(51) Int. Cl.
*F16H 25/24* (2006.01)
*F16B 37/00* (2006.01)

(52) U.S. Cl.
CPC ............. *F16H 25/24* (2013.01); *F16B 37/00* (2013.01)

(58) Field of Classification Search
CPC .... F16H 25/24; F16H 25/20; F16H 2025/249; F16B 37/00
See application file for complete search history.

(56) References Cited

U.S. PATENT DOCUMENTS

| 4,790,971 | A | * | 12/1988 | Brown | F16H 25/24 264/318 |
| 4,836,727 | A | * | 6/1989 | Volkmann | F16B 31/021 411/432 |
| 11,268,607 | B1 | * | 3/2022 | Nook | B29C 45/14819 |
| 2017/0008137 | A1 | * | 1/2017 | Coronado | B29C 70/682 |
| 2020/0262470 | A1 | * | 8/2020 | Kondo | B62D 5/001 |
| 2021/0339654 | A1 | * | 11/2021 | Napau | B60N 2/929 |

FOREIGN PATENT DOCUMENTS

| JP | 2018194114 A | * | 12/2018 | |
| WO | WO-9503919 A1 | * | 2/1995 | ............ B24B 19/12 |
| WO | WO-2013022094 A1 | * | 2/2013 | ............ C08L 71/00 |
| WO | WO-2019225554 A1 | * | 11/2019 | |

* cited by examiner

*Primary Examiner* — Zakaria Elahmadi
(74) *Attorney, Agent, or Firm* — Chun-Ming Shih; HDLS IPR Services

(57) ABSTRACT

The disclosure is a nut structure for an electric pushing rod. The electric pushing rod has a guide screw (A) with an outer thread (A1). The nut structure includes a metal cylinder (10) and a plastic intermediate component (20). The metal cylinder (10) has a pivot hole (11) being passed through by the guide screw (A). An inner wall of the pivot (11) is provided with an inner thread (12). The plastic intermediate component (20) covers the inner thread (12) and is disposed of between the outer thread (A1) and the inner thread (12). The plastic intermediate component (20) includes a fixed side thread (21) mounted on the inner thread (12) and a driving side thread (22) screwed with the outer thread (A1). Therefore, the strength may be enhanced to avoid both the nut structure from being broken and the driving side thread (22) from getting stripped.

7 Claims, 4 Drawing Sheets

NUT STRUCTURE FOR ELECTRIC PUSHING ROD

BACKGROUND

Technical Field

The disclosure relates to an electric pushing rod, particularly to a nut structure for an electric pushing rod.

Related Art

A general electric pushing rod includes an electric power source, a guide screw and a nut structure. The guide screw is screwed in the nut structure. The guide screw is connected with the electric power source to be electrically driven to move in the nut structure. The nut structure and the guide screw have an inner thread and an outer thread corresponding to the inner thread. The nut structure is usually made of metal or plastic.

However, a nut structure made of metal possesses higher strength, but noise and heat are easily generated by friction between the guide screw and the nut structure when the guide screw is operating. That reduces the operatable times of the guide screw in the unit time. While a nut structure made of plastic possesses lower strength, the nut structure tends to be broken and the inner thread tends to get stripped when the guide screw is operating. Thus, how to make the nut structure keep a specific strength and prevent the guide screw from generating noise and heat resulting from the friction in operating is an issue to be solved.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to enhance strength to prevent both a nut structure from being broken and a driving side thread from getting stripped. Also, noise and heat generated by the operation of a guide screw may be effectively reduced, and the operatable times of the guide screw in the unit time may further be increased.

To accomplish the above object, the disclosure provides a nut structure for an electric pushing rod. The electric pushing rod has a guide screw with an outer thread. The nut structure includes a metal cylinder and a plastic intermediate component. The metal cylinder has a pivot hole being passed through by the guide screw. An inner wall of the pivot is provided with an inner thread. The plastic intermediate component covers the inner thread and is disposed between the outer thread and the inner thread. The plastic intermediate component includes a fixed side thread mounted on the inner thread and a driving side thread screwed with the outer thread.

In addition, the nut structure of the disclosure utilizes the positioning grooves and the positioning protrusions to prevent the guide screw from driving the plastic intermediate component to rotate jointly during rotation. The filling holes and the blockers may effectively fix the plastic intermediate component to prevent that from shaking toward the longitudinal direction and the transversal direction of the metal cylinder.

DETAILED DESCRIPTION

Figure 1:
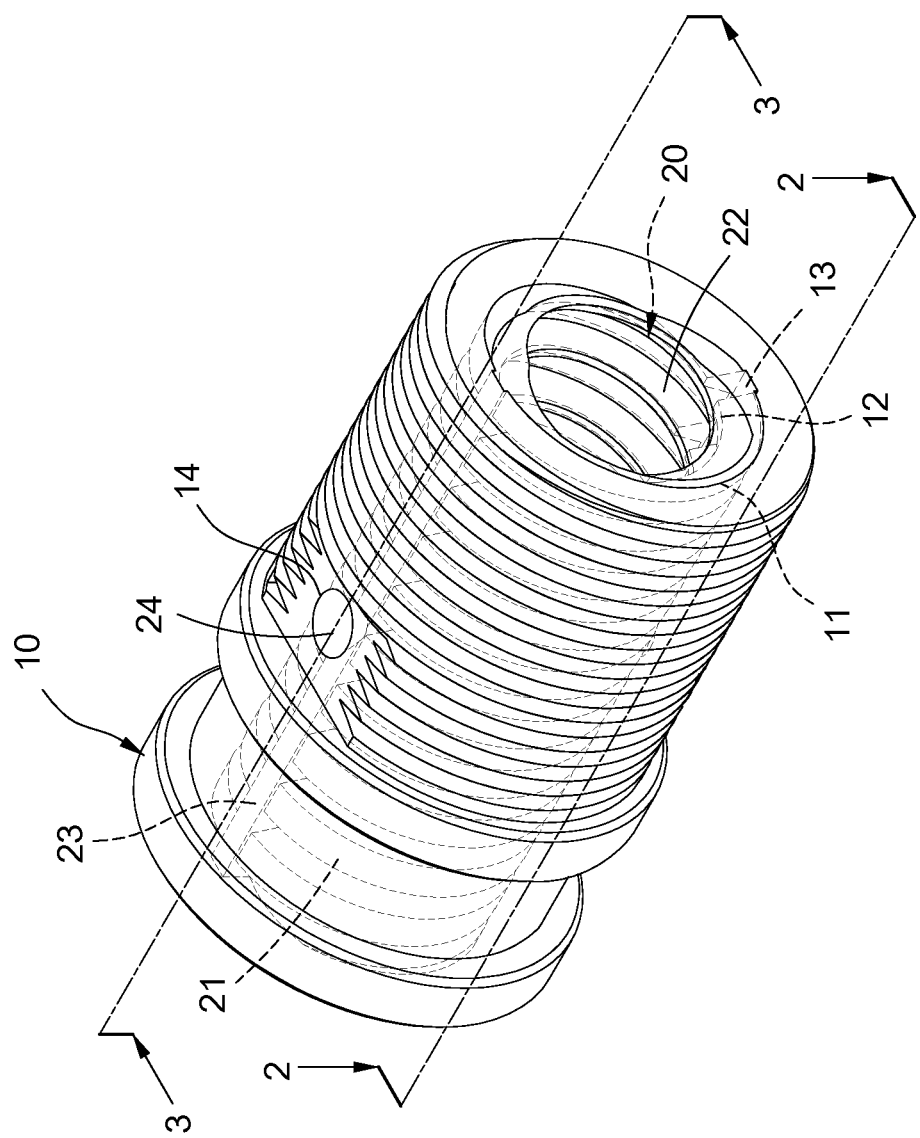
FIG. 1 is a perspective view of the disclosure.
Figure 2:
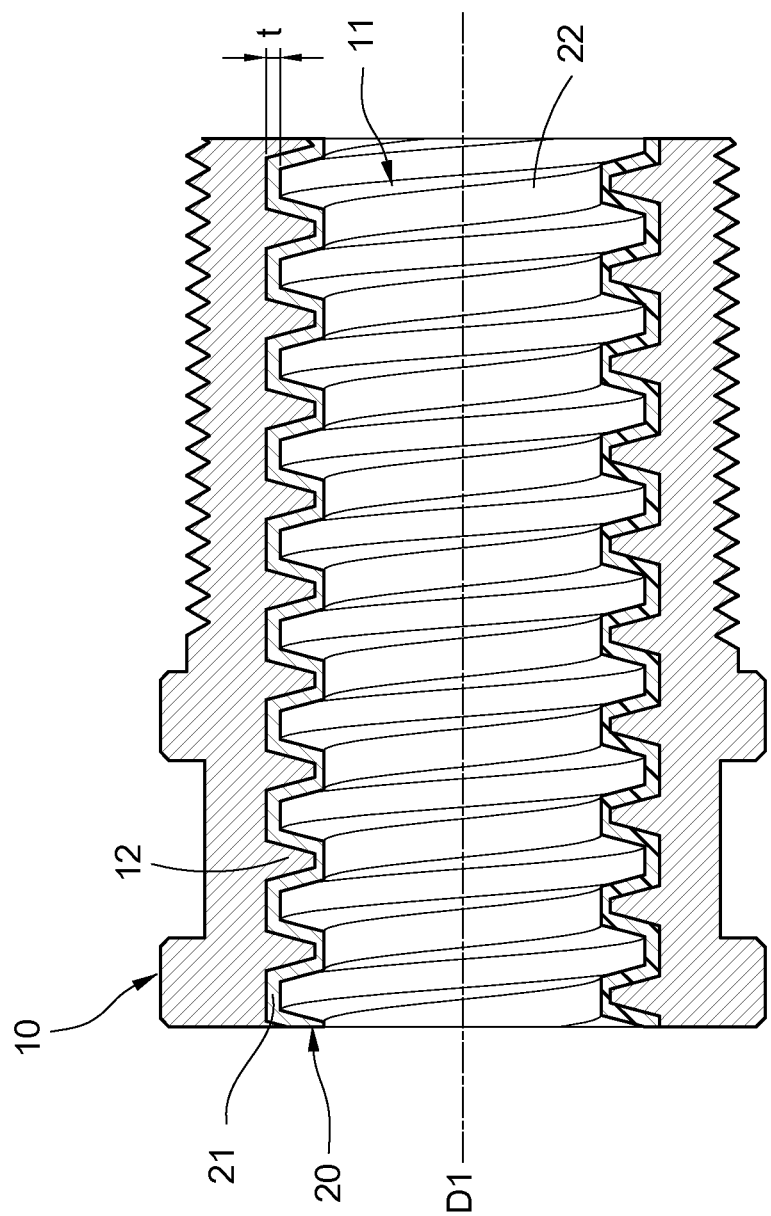
FIG. 2 is a cross-sectional view along line 2-2 in FIG. 1.

The technical contents of this disclosure will become apparent with the detailed description of embodiments accompanied with the illustration of related drawings as follows. It is intended that the embodiments and drawings disclosed herein are to be considered illustrative rather than restrictive.

The disclosure provides a nut structure for an electric pushing rod. Please refer to FIGS. 1-4. The electric pushing rod includes a guide screw A with an outer thread A1. The nut structure includes a metal cylinder 10 and a plastic intermediate component 20.

The metal cylinder 10 is made of a metal material such as stainless steel, iron, copper, aluminum or an alloy thereof. The metal cylinder 10 is of a tubular shape. The metal cylinder 10 has a pivot hole 11 for the guide screw A to pass through. An inner wall of the pivot hole 11 is provided with an inner thread 12. The plastic intermediate component 20 is made of a plastic material such as POM, PPS, TPI, PBI, PI or PEEK and formed by the insert molding process. The plastic intermediate component 20 covers the inner thread 12 and is disposed between the outer thread A1 and the inner thread 12. The plastic intermediate component 20 includes a fixed side thread 21 mounted on and fixed with the inner thread 12 and a driving side thread 22 screwed with the outer thread A1.

Figure 4:
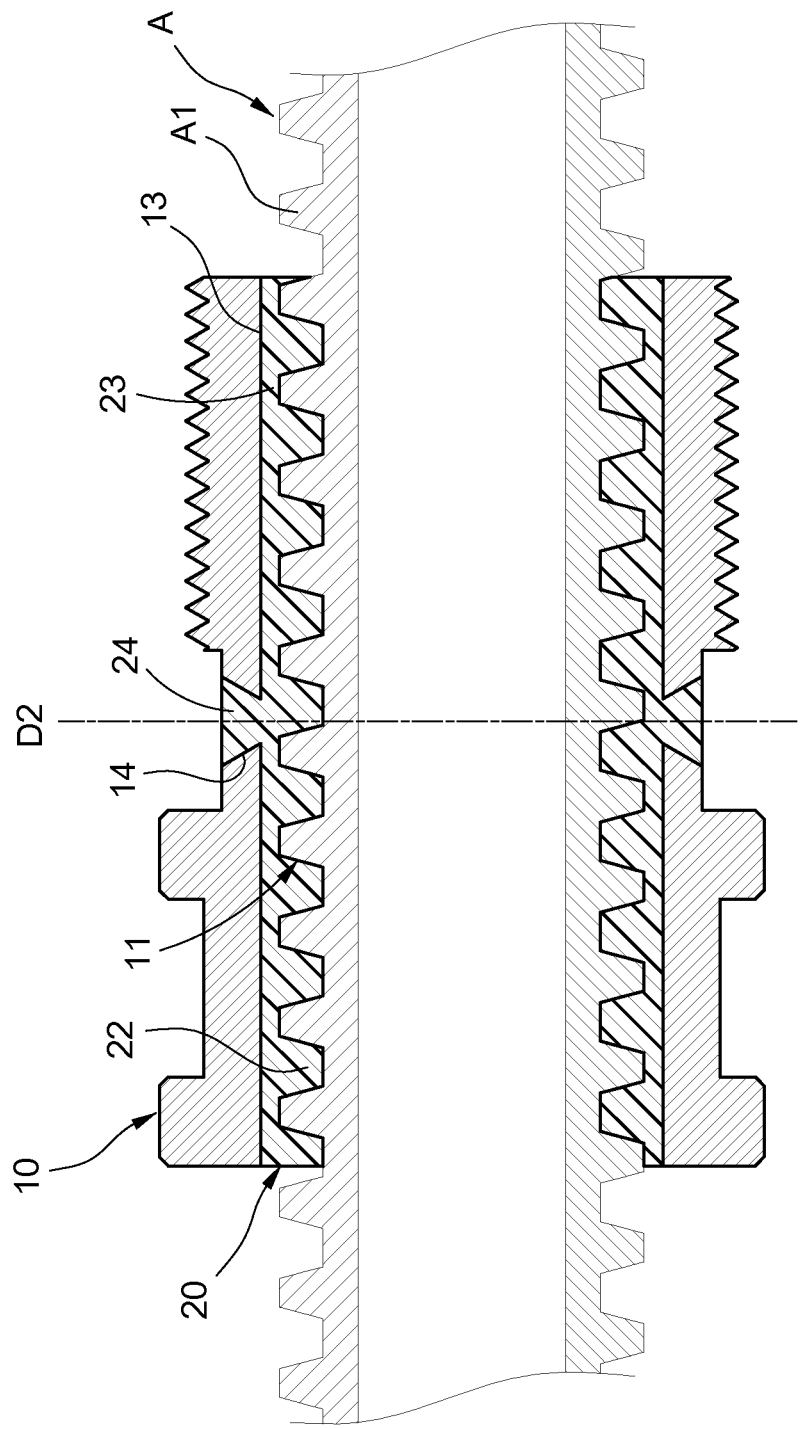
FIG. 4 is a cross-sectional view of the disclosure in use.

Please refer to FIG. 4. A screw lead of the inner thread 12 of the metal cylinder 10 is the same as a screw lead of the outer thread A1 of the guide screw A. Particularly, the screw lead is defined as the linear moving distance of the thread in one screw revolution (i.e., 360°). Please refer to FIG. 2. The thickness t of the plastic intermediate component 20 between a surface of the fixed side thread 21 and a surface of the driving side thread 22 is between 0.6 mm and 1 mm. In some embodiments, the thickness t is 0.8 mm. Therefore, the plastic intermediate component 20 may possess a specific strength and prevent a diameter of the metal cylinder 10 from being oversized.

Figure 3:
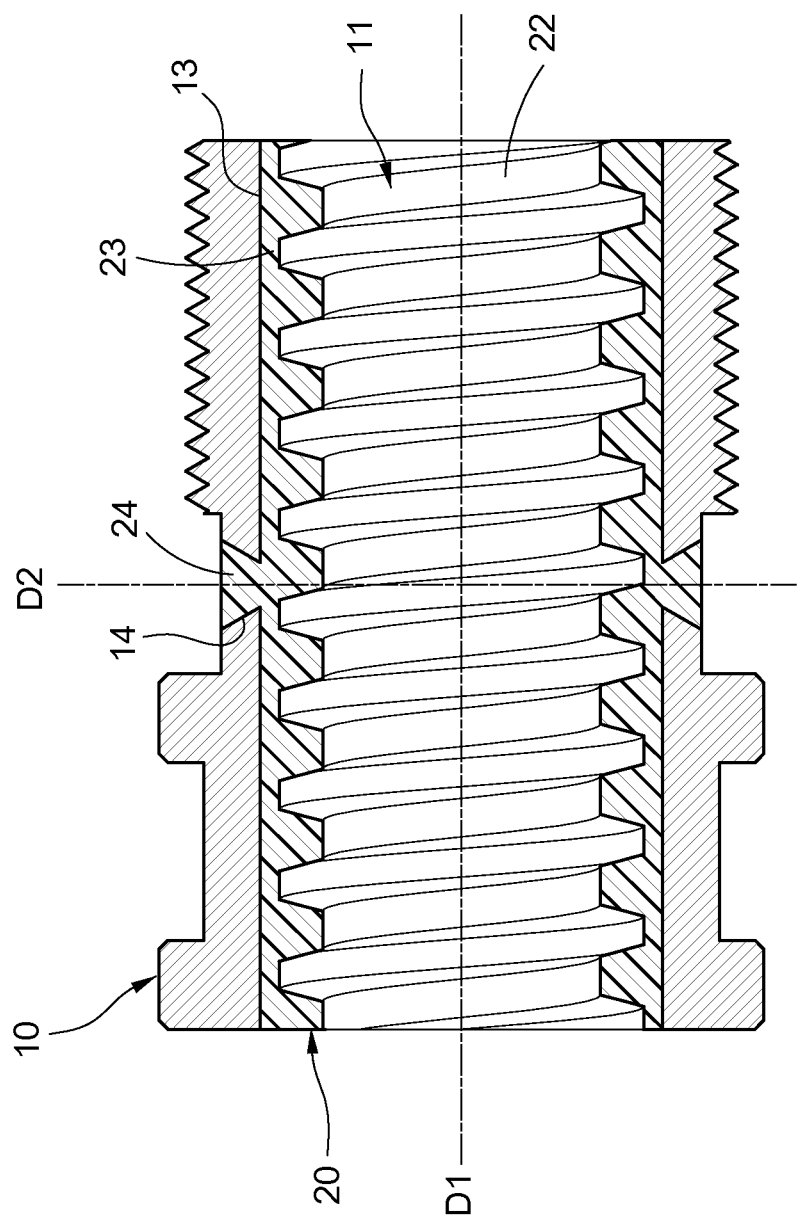
FIG. 3 is a cross-sectional view along line 3-3 in FIG. 1.

In detail, please refer to FIG. 3, in this embodiment, the metal cylinder 10 has an axial direction D1. Multiple positioning grooves 13 are disposed on the metal cylinder 10 along the axial direction D1 and passes through the inner thread 12. The plastic intermediate component 20 is formed with multiple positioning protrusions 23 corresponding to the positioning grooves 13 and engaging with the positioning grooves 13. As a result, the plastic intermediate component 20 is blocked along the axial direction D1 of the metal cylinder 10 to prevent the guide screw A from driving the plastic intermediate component 20 to rotate jointly during rotation. The numbers of the positioning grooves 13 and the number of the positioning protrusions 23 are not limited, for example, each of which may be one, three or four in number, depending on the requirements of plastic forming or positioning stability.

In this embodiment, the metal cylinder 10 further has a radial direction D2 perpendicular to the axial direction D1. Multiple filling holes 14 are disposed on the metal cylinder 10 along the radial direction D2 and communicates with the positioning grooves 13. The plastic intermediate component 20 is formed with multiple blockers 24 accommodated in the filling holes 14 and separately connected with each of the positioning protrusions 23. Each blocker 24 is of a conic shape. Plastic liquid may be filled through the filling holes 14. After the blockers 24 are formed, the plastic intermediate component 20 is effectively fixed to be prevented from shaking toward the axial direction D2 and the radial direction D2 of the metal cylinder 10. In some embodiments, the filling holes 14 are located on the middle of the metal cylinder 10 to make the plastic liquid uniformly spread toward two sides. The numbers of the positioning protrusions 23 and the number of the blockers 24 are not limited, for example, each of which may be one, three or four in number, depending on the requirements of plastic forming or positioning stability.

Therefore, the strength of the nut structure may be enhanced by the metal cylinder 10, and the generated noise and heat may be reduced through the plastic intermediate component 20 contacting with the guide screw A. Accordingly, the working efficiency of the guide screw A may be effectively increased.

While this disclosure has been described by means of specific embodiments, numerous modifications and variations could be made thereto by those skilled in the art without departing from the scope and spirit of this disclosure set forth in the claims.

What is claimed is:

1. A nut structure for an electric pushing rod, the electric pushing rod comprising a guide screw (A), the guide screw (A) comprising an outer thread (A1), the nut structure comprising:
   a metal cylinder (10), comprising a pivot hole (11) being passed through by the guide screw (A), and an inner thread (12) directly formed on an inner wall of the metal cylinder (10), wherein the metal cylinder (10) comprises an axial direction (D1) and a positioning groove (13) formed on the inner wall along the axial direction (D1) and cutting through the inner thread (12) till the inner wall, and a filling hole (14) is formed through the metal cylinder (10) and communicates with the pivot hole (11) for plastic liquid filling therethrough to completely fill the positioning groove (13) to form a positioning protrusion (23) after solidifying, wherein the positioning protrusion (23) is corresponding to and engaging with the positioning groove (13); and
   a plastic intermediate component (20), insert molding into the metal cylinder (10) and covering the inner thread (12), disposed between the outer thread (A1) and the inner thread (12), and comprising a fixed side thread (21) mounted on the inner thread (12) and a driving side thread (22) screwed with the outer thread (A1);
   wherein a thickness (t) of the plastic intermediate component (20) between a surface of the fixed side thread (21) and a surface of the driving side thread (22) is between 0.6 mm and 1 mm.

2. The nut structure of claim 1, wherein a screw lead of the inner thread (12) is the same as a screw lead of the outer thread (A1).

3. The nut structure of claim 1, wherein the metal cylinder (10) is of a tubular shape, and since the positioning protrusion (23) is disposed on the plastic intermediate component (20) corresponding to and engaging with the positioning groove (13), the plastic intermediate component (20) is blocked along the axial direction D1 of the metal cylinder (10) to prevent the guide screw A from driving the plastic intermediate component (20) to rotate jointly during rotation.

4. The nut structure of claim 1, wherein a blocker (24) is disposed on the plastic intermediate component (20) and accommodated in the filling hole (14) to connect with the positioning protrusion (23).

5. The nut structure of claim 4, wherein the blocker (24) is of a conic shape.

6. The nut structure of claim 1, wherein the filling hole (14) is located on a middle of the metal cylinder (10).

7. The nut structure of claim 6, wherein a blocker (24) is formed on the plastic intermediate component (20) and accommodated in the filling hole (14) by the plastic liquid to connect with the positioning protrusion (23).

* * * * *